T. J. STURTEVANT.
MACHINE FOR MIXING MATERIALS.
APPLICATION FILED MAR. 18, 1921.

1,385,849.

Patented July 26, 1921.
7 SHEETS—SHEET 1.

Fig. 1

Inventor:
Thomas J. Sturtevant
by Robt. P. Harris
Attorney

Fig. 3

T. J. STURTEVANT.
MACHINE FOR MIXING MATERIALS.
APPLICATION FILED MAR. 18, 1921.

1,385,849.

Patented July 26, 1921.
7 SHEETS—SHEET 4.

Fig. 4

Inventor:
Thomas J. Sturtevant
by Robt. P. Harris.
Attorney

T. J. STURTEVANT.
MACHINE FOR MIXING MATERIALS.
APPLICATION FILED MAR. 18, 1921.

1,385,849.

Patented July 26, 1921.
7 SHEETS—SHEET 6.

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

MACHINE FOR MIXING MATERIALS.

1,385,849.     Specification of Letters Patent.     Patented July 26, 1921.

Application filed March 18, 1921. Serial No. 453,282.

*To all whom it may concern:*

Be it known that I, THOMAS J. STURTEVANT, a citizen of the United States, residing at Wellesley, in the county of Norfolk and State of Massachusetts, have invented an Improvement in Machines for Mixing Materials, of which the following description, in connection with the accompanying drawings, is a specification, like characters on the drawings representing like parts.

The invention to be hereinafter described relates to a machine for mixing materials.

In the use of these mixing machines, in some instances it is desirable to deliver a batch of materials of predetermined volume or weight into the machine, to mix the materials a certain length of time, and then to discharge the materials from the machine. It is also desirable that successive batches introduced into the mixer shall be mixed the same length of time, in order that the materials may be uniformly mixed.

One of the purposes of the present invention, therefore, is to provide means for automatically controlling the delivery of materials into the mixer, and the discharge of the materials therefrom, to the end that successive batches may be uniformly mixed.

With the aforesaid and other purposes in view, the character of the invention will be best understood by reference to the following description of one good form thereof, shown in the accompanying drawings, wherein:

Referring to the drawings, the mixer machine shown therein, in the present instance of the invention, for purposes of illustration, is associated with an elevator 1 (Fig. 1) of any suitable construction, in the present instance, comprising a casing 3 containing a chain or belt 5 provided with buckets 7. This bucket chain passes about an upper wheel 9 and a lower wheel 11, the upper wheel being mounted on a shaft 13 provided with a pinion 15 meshing with a gear 17 on a shaft 19 which may be driven by any suitable means.

Figure 1:
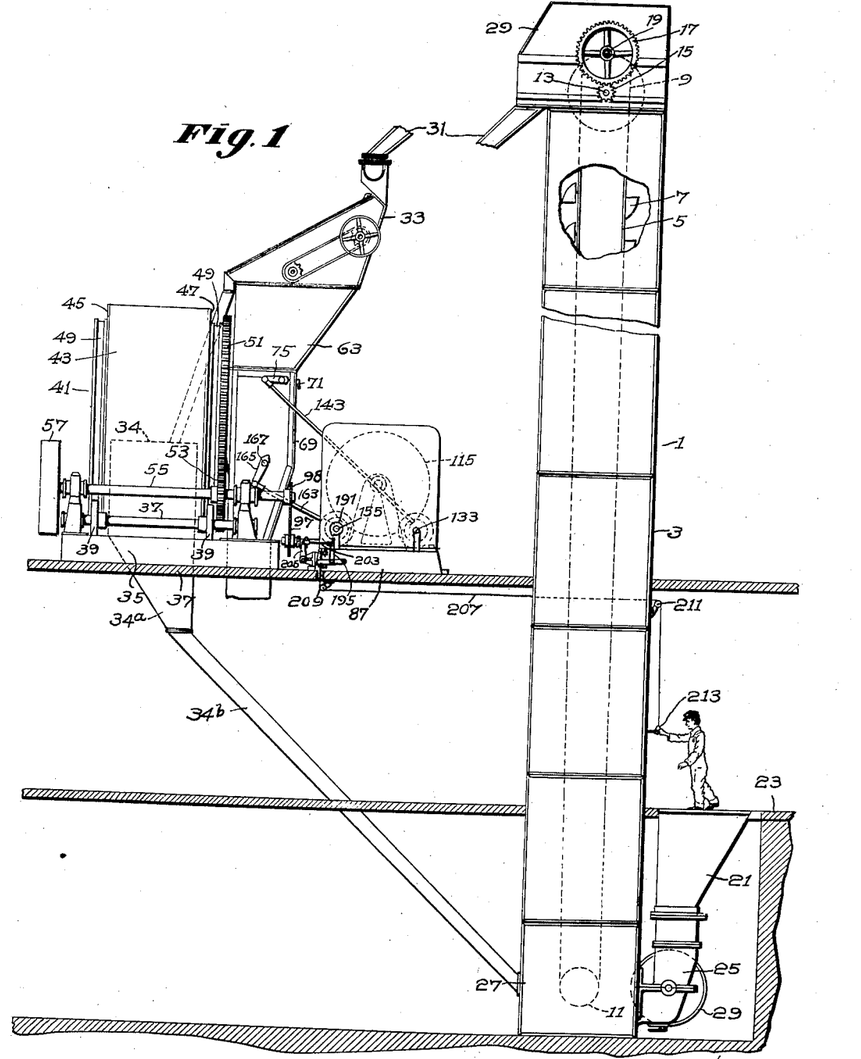
Figure 1 is an elevation of a mixing machine embodying the invention, for convenience of illustration associated with an elevator and a separator.

Adjacent the lower end of the elevator casing is an assembly hopper 21 having its upper end substantially flush with a floor 23, and its lower end communicating with a throat 25 communicating in turn with the boot 27 of the elevator. A rotary feeder of usual construction may be mounted in this throat and be driven by a pulley 29.

The materials to be mixed may be delivered in batches into the assembly hopper 21 and pass thence into the boot 27. They are then elevated by the bucket chain to the hood 29 of the elevator, and discharged from the hood.

In the present instance of the invention, the materials are conducted by a chute 31 from the hood to a screen or other separator 33 which may be of usual construction, and therefore, it is unnecessary to show and describe the same in detail herein. The coarser materials may be delivered from the separator through a chute 34ª to a usual reducing machine 34, and may be returned from the latter to the elevator through a chute 34ᵇ. The finer materials graded by the separator may be delivered into the mixer, which will now be described.

This mixer, in the present instance of the invention, comprises a base 35 which may be mounted on a floor 36 above the level of the floor 23 referred to, the latter floor being flush with the upper end of the assembly hopper 21.

Shafts 37 (Figs. 2 and 8) are journaled in bearings mounted on the base 35, and each of these shafts has a pair of wheels 39 fast thereon.

The casing 41 for the mixer comprises, in the present instance, a cylindrical shell 43 provided with heads 45 and 47. These heads may have flanges projecting therefrom on which are shrunk tires 49 adapted to rest upon and be supported by the wheels 39 referred to.

One of these tires 49 may be provided with a toothed ring 51 meshing with a gear 53 fast on a shaft 55 journaled in bearings mounted on the base 35. A pulley 57 is mounted fast on one end of the shaft 55, and is driven by any suitable source of power.

The mixer casing is provided with appropriate devices for mixing the materials introduced therein on rotation thereof. These devices, in the present instance of the invention, comprise a series of buckets 59 (Figs. 2 and 8) suitably secured to and projecting inwardly from the cylindrical shell 43 of the mixer casing. Also secured to and projecting inwardly from the cylindrical shell are vanes 61 located at opposite sides of the buckets 59 and disposed obliquely in respect to the heads of the casing.

Figure 2:
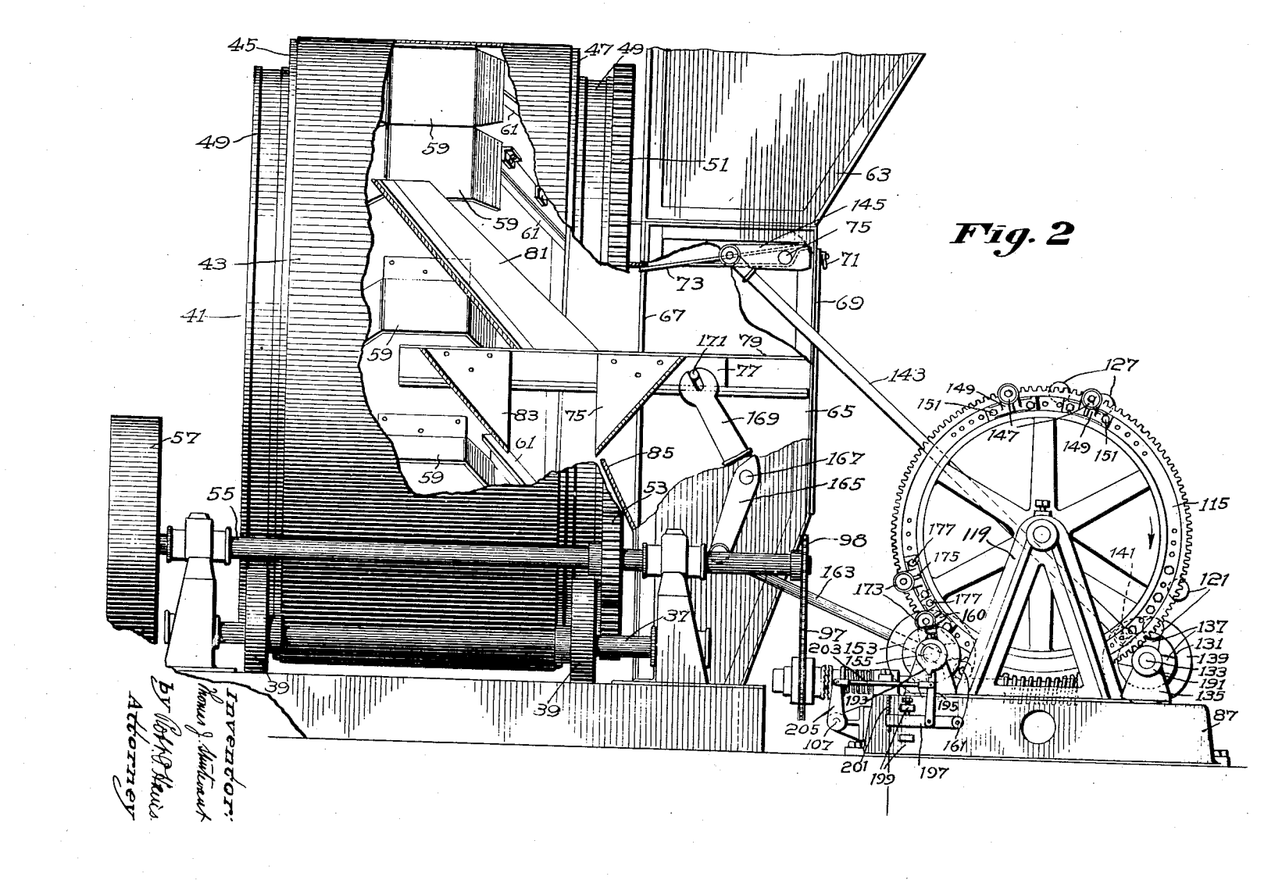
Fig. 2 on an enlarged scale is an elevation of the mixer machine and controlling apparatus associated therewith, portions of the mixer being broken away to disclose parts located in the interior thereof.
Figure 8:
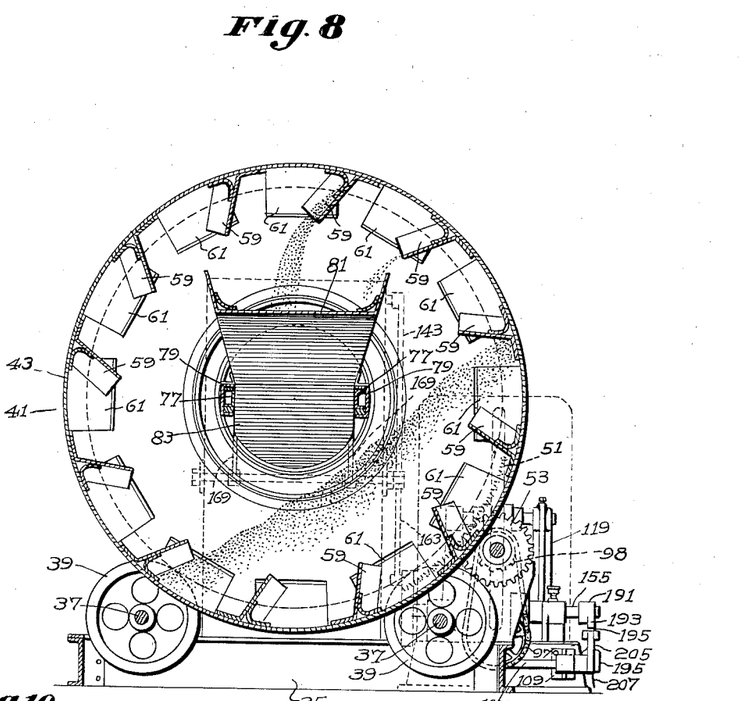
Fig. 8 is a vertical section through the mixing machine.

The construction is such that on rotation of the mixer casing, the materials therein will be elevated by the buckets and vanes from the lower end of the casing to the upper end thereof, and as the buckets and vanes approach the uppermost point of their orbit, the materials carried upward thereby will be spilled therefrom and gravitate downward to the lower portion of the casing. Thus, the materials will be thrown about within the casing and thoroughly agitated and mixed.

Suitable means may be provided to conduct the materials into the mixer casing. This means, in the present instance, comprises a feeding-in hopper 63 (Figs. 1 and 2) mounted on a chute or hopper 65, in turn mounted on the base 35. This chute 65 has an aperture 67 at the inner side thereof communicating with a similar aperture in the head of the mixer casing adjacent thereto. The opposite side of the chute 65 may be provided with an opening normally closed by a cover 69 secured by appropriate latches 71. This cover may be readily removed when desired, to enable convenient access to the interior of the chute and the parts therein.

To control the delivery of materials from the feeding-in hopper 63, a valve or gate 73 may be provided fast on a shaft 75 journaled in suitable bearings mounted on the chute 65. This valve or gate may be operated by the controlling apparatus to be described, so as to admit batches of materials from the feeding-in hopper to the mixer casing at the times required.

Figure 3:
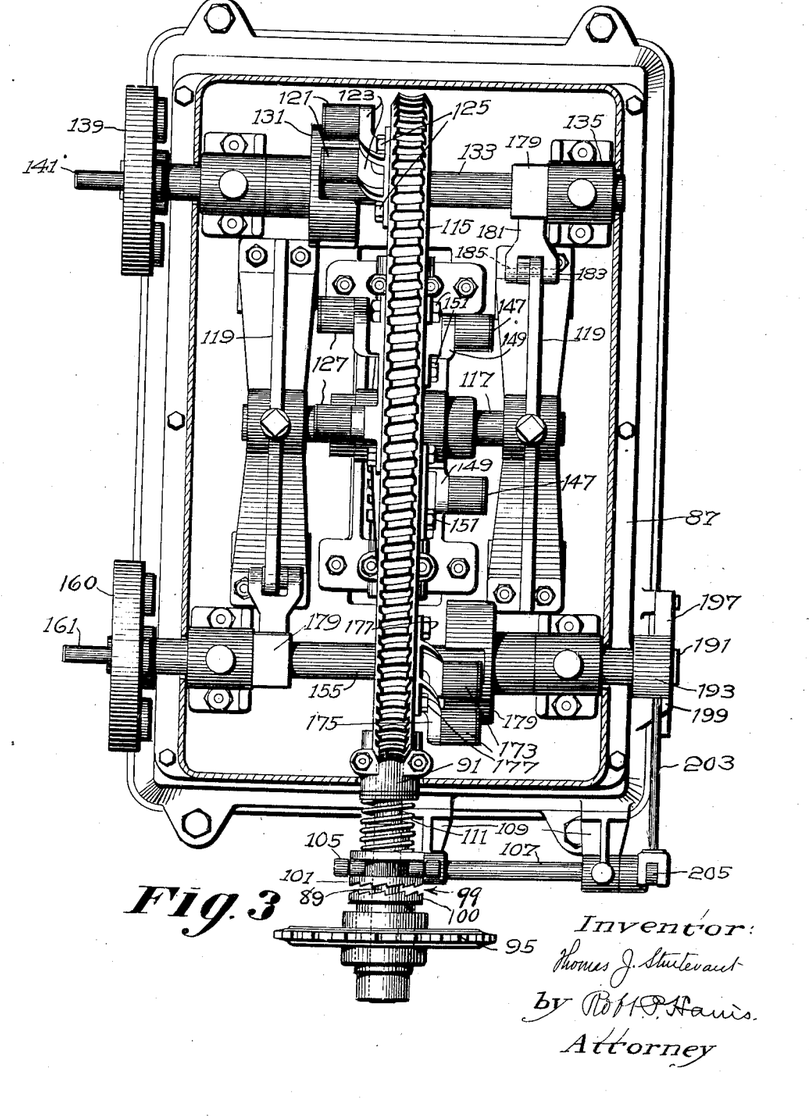
Fig. 3 on an enlarged scale is a plan of the controlling apparatus, the casing therefor being shown in section.

Suitable valve means may be provided to guide or control admission of the materials from the valve or gate 73 through the chute opening 67 into the mixer casing. This means, in the present instance, comprises a valve or chute 75 having opposed ends thereof secured to channel bars 77 (Figs 2 and 3) mounted in and adapted to slide along tracks, in the present instance, in the form of channel guideways 79, having portions secured to opposed walls of the fixed casing 65 and free portions projecting through the opening 67 a substantial distance into the interior of the mixer casing.

A valve or chute 81 (Figs. 2 and 8) may be mounted on the tracks 79 and project therefrom upwardly into the mixer casing. The construction is such that the materials spilling from the buckets and vanes may gravitate into the chute 81, and either pass downward therefrom into the lower portion of the mixer or casing, or pass downwardly therefrom outwardly through the opening 67 into the casing 65, as more fully hereinafter described.

Suitable valve means may be provided to guide or control admission of the materials from the chute 81 into the discharge casing 65. This means, in the present instance of the invention, comprises a valve or chute 83 which may be similar to the chute 75 referred to, and may be secured to the channel bars 77 which serve to support the chute 75. The chutes 75 and 83 are mounted on the channel bars 77 a substantial distance apart, and are oppositely directed.

When the chutes 75 and 83 are in the positions shown in Fig. 2, the materials elevated by the buckets and vanes will spill therefrom into the fixed inclined chute 81 and pass thence against the chute 75 and be deflected thereby toward the bottom portion of the casing.

When the chutes 75 and 83 are shifted toward the right (Fig. 2), the chute 83 may be brought into registration with the lower end of the fixed chute 81. Then the materials elevated by the buckets and vanes will pass from the chute 81 along the chute 83 and into the discharge casing 65. A guide plate 85 may be provided to assist in guiding the materials from the mixer into the discharge casing. The chutes 75 and 83 may be shifted to their different positions by the controlling apparatus to be described. The chutes 75 and 83 supported by the channel bars 77 constitute a good form of valve or valve means for guiding or controlling admission of materials into the mixer, or discharge of materials therefrom.

To facilitate understanding of the cycle of operations of the gate 73 and the chutes 75 and 83, reference may be had to Figs. 10 to 13.

Figure 10:
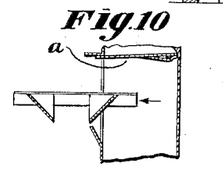

When the gate is closed and the chutes are in the position shown in Fig. 10, a batch of materials in the feeding-in hopper 63 is ready to be delivered into the mixer. To accomplish this, the gate 73 is rocked downward to its position shown in Fig. 11, thereby allowing the batch of materials to flow from the feeding-in hopper down along the gate and along the feeding-in chute into the mixer.

Figures 9, 12, 13:
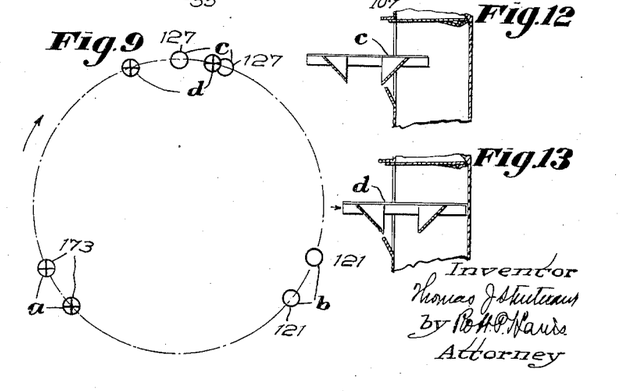
Fig. 9 is a diagram illustrating the operations of the controlling apparatus.
Figs. 10 to 13 inclusive are details illustrating the successive positions of the valves operated by the controlling device.

After the batch of materials has been discharged into the mixer, the gate should be closed to the position shown in Fig. 12, so as to be ready to receive the next batch of materials while the previous batch is being mixed in the mixer.

After sufficient time has elapsed to mix the materials as required, the chutes are shifted toward the right to the positions shown in Fig. 13, thereby discharging the batch of materials from the mixer into the discharge casing 65. They may be conducted from the latter through a chute or piping to any point desired.

After sufficient time has elapsed to discharge the materials from the mixer, the chutes are shifted to the left to their positions shown in Fig. 10, so as to be in readiness to guide the next batch of materials into the mixer on opening of the gate at the lower end of the feeding-in hopper.

Figure 4:
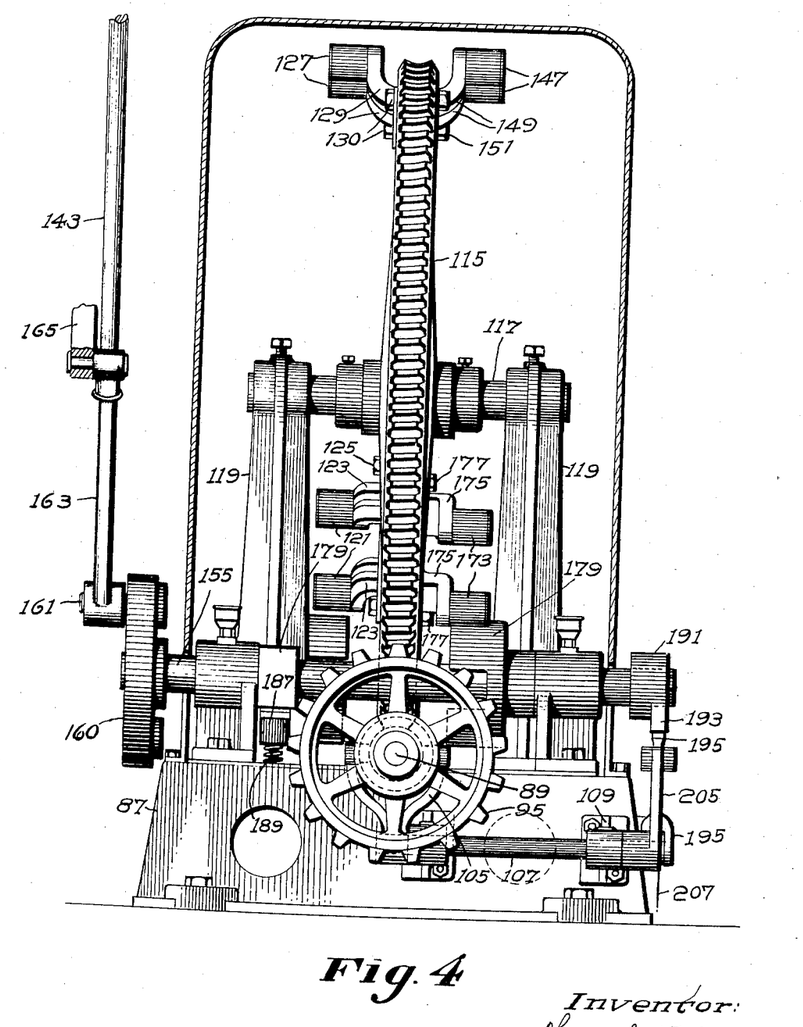
Fig. 4 is an end elevation of the controlling apparatus, the casing therefor being shown in section.

Next will be described the apparatus for controlling the gate and the chutes. This apparatus, in the present instance, comprises a base 87 (Figs. 1, 2 and 4) which may be mounted desirably on the same floor 37 which supports the mixer. A shaft 89 is journaled in bearings 91 and 93 (Fig. 7) mounted on the base 87. Suitable means may be provided for rotating this shaft, in the present instance, comprising a sprocket wheel 95 loose on the shaft 89 and connected by a sprocket chain 97 with a sprocket wheel 98 fast on the mixer casing drive shaft 55 referred to.

It is desirable to provide means to connect the sprocket wheel 95 with and disconnect the same from the shaft 89. This means, in the present instance, comprises a clutch 99 including a member 100 fast on the hub of the sprocket wheel 95, and a member 101 splined to and slidable on the shaft 93. The member 101 is provided with an annular groove 103 receiving the upper end of a clevis 105 fast on a rock shaft 107 mounted in bearings in brackets 109 projecting from one side of the base 87.

A coil spring 111 encircles the shaft 93, and is confined between the clutch member 101 and an end of one of the bearings 91 referred to. This spring tends to shift the clutch member 101 to the left (Fig. 7) and into engagement with the clutch member 100, in order that the sprocket wheel 95 may rotate the shaft 93.

The shaft 93 has a worm 113 fast thereon meshing with a large worm wheel 115 (Figs. 2, 3 and 4) which may be called the main wheel of the control apparatus. This wheel is mounted fast on a shaft 117 journaled in bearings in uprights 119 rising from the base 87.

To control the gate 73 at the lower end of the feeding-in hopper 63, the main wheel may be provided with a pair of rollers 121 carried by arms 123 connected by bolts 125 with the rim of the main wheel. These bolts may be entered through selected holes of the series of holes in the wheel rim, in order that the spacing of the rollers 121 may be varied to effect the control of the gate as required.

A similar pair of rollers 127 may be carried by arms 129 adjustably secured by bolts 130 to the rim of the wheel.

These pairs of rollers are adapted incrementally to turn a Geneva gear 131 fast on a shaft 133 extending transversely to the worm shaft 93 referred to, and journaled in bearings in brackets 135 mounted on the base 87. The Geneva gear, in the present instance, is provided with four radial slots 137, and in the course of the rotation of the main wheel 115, the pairs of rollers 121 and 127 are adapted to work into the radial slots 137 incrementally to advance the Geneva gear.

Suitable means may be provided operatively to connect the Geneva gear shaft 133 with the gate 73. This means, in the present instance comprises a disk 139 fast on the shaft 133 and connected by a wrist pin 141 with the lower end of a connecting rod 143 (Fig. 2). The upper end of this connecting rod is connected to an arm 145 fast on the shaft 75 referred to, of the gate 73.

Figure 5:
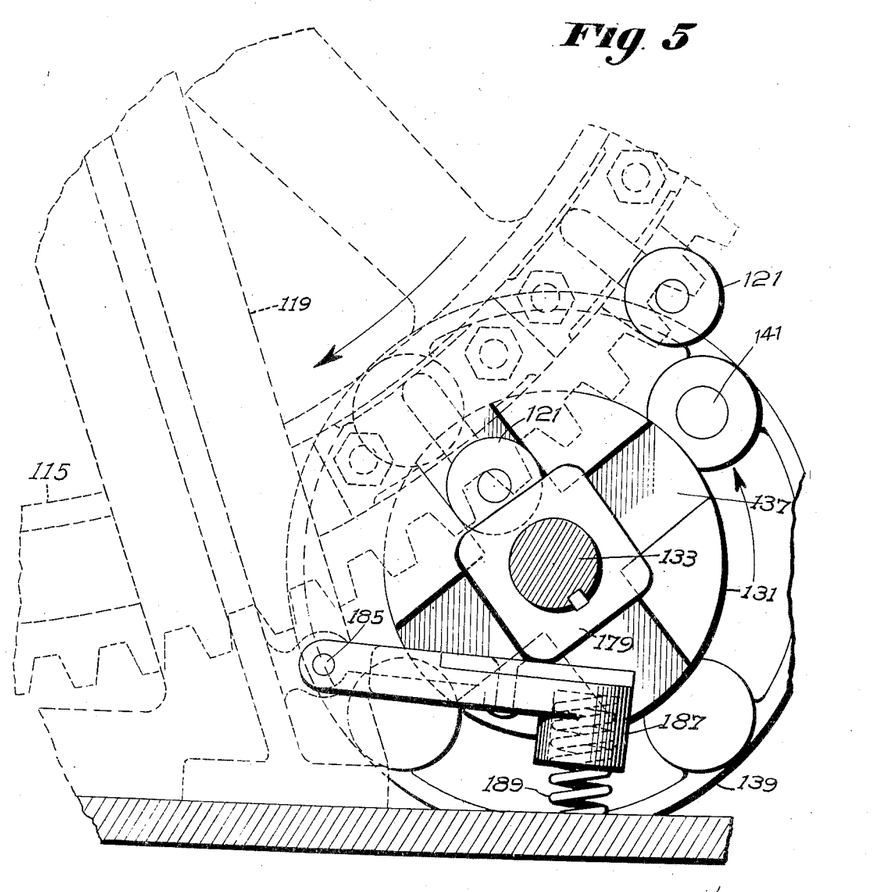
Fig. 5 on an enlarged scale is a sectional detail of a Geneva gear for operating the valve or gate for controlling the delivery of materials from the mixer hopper into the mixer machine, and parts associated with the Geneva gear for controlling the movements thereof.

The construction is such that in the course of the rotation of the main wheel 115 in a clockwise direction (Figs. 2 and 5), the advancing roller of the pair of rollers 121 will work into one of the radial slots of the Geneva gear, and rotate the latter a step in a contraclockwise direction. Thereupon, the trailing roller of the pair of rollers 121 will work into the next radial slot of the Geneva gear and advance the latter a further step. These movements will be transmitted by the connecting rod to the gate, and serve to rock the same from its closed position shown in Fig. 10 to its open position shown in Fig. 11 to deliver the batch of materials from the hopper into the mixer.

When the main wheel has rotated in a clockwise direction a sufficient distance, the advancing roller of the pair of rollers 127 will work into one of the radial slots of the Geneva gear 131, and rotate the latter a step in a contra-clockwise direction. Thereupon, the trailing roller of the pair of rollers 127 will work into the next radial slot of the Geneva gear and advance the same a second step. These movements of the Geneva gear will be transmitted by the connecting rod 143 to the gate 73, and move the latter from its open position shown in Fig. 11 to its closed position shown in Fig. 10, so that the hopper may be in readiness to receive the next batch of materials.

The construction is preferably such that when the gate is closed, the wrist pin 141 will be substantially on a dead center with respect to the axis of the disk shaft 139, thereby facilitating holding of the gate in its closed position.

Next will be described the means for controlling the shifting of the chutes 75 and 83 to their positions described. This means, in the present instance, comprises a pair of rollers 147 carried by arms 149 adjustably connected by bolts 151 with the rim of the main wheel 115.

Coöperating with this pair of rollers 147 is a Geneva gear 153 (Figs. 2 and 6) fast on a shaft 155 extending transversely to the worm shaft 93 referred to, and journaled in bearings in brackets 157 on the base 87. This Geneva gear, in the present instance, has four radial slots 159 therein coöperating with the pair of rollers 147.

Suitable means may be provided to transmit movements from the Geneva gear shaft 155 to the chute slides 77. This means, in the present instance, comprises a disk 160 (Figs. 2, 3 and 4) connected by a wrist pin 161 with the lower end of a connecting rod 163. The upper end of this connecting rod is connected to a crank 165 fast on a shaft 167 journaled in bearings carried by the discharge casing 65. Fast on the shaft 167 are a pair of arms 169 having forks at the upper ends thereof receiving pins 171 projecting outwardly from the slides 77.

The construction is such that in the course of the rotation of the main wheel 115, the advancing roller of the pair of rollers 147 will work into one of the radial slots of the Geneva gear 153 and turn the same a step. Thereupon, the trailing roller of the pair of rollers 147 will work into the next adjacent slot of the Geneva gear and advance the same a second step. These movements will be transmitted by the connecting rod 163, the crank 165 and forked arms 169 to the slides 77, thereby shifting the chutes from their positions shown in Fig. 12 to their positions shown in Fig. 13, so as to discharge the materials from the mixer into the chute or casing 65.

Preferably the rollers 147 are spaced a sufficient distance apart to allow a dwell between the two steps in the movement of the chutes toward the right, in order that the materials may not be shifed to discharge the materials too suddenly.

Figure 11:
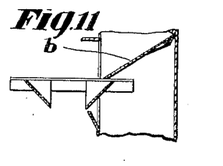

Suitable means may be provided to shift the chutes to the left to their positions shown in Figs. 10, 11 and 12, in order to deliver materials from the gate 73 into the mixer and to prevent discharge of the materials from the mixer during the mixing operation. This means, in the present instance, comprises a pair of rollers 173 carried by arms 175 adjustably secured to the rim of the main wheel 115 by bolts 177.

The construction is such that in the course of the rotation of the wheel, the advancing roller of the pair of rollers 173 will work into one of the radial slots of the Geneva gear 153 and advance the same a step. Thereupon, the trailing roller of this pair of rollers will work into the next adjacent radial slot of the Geneva gear and advance the same a second step. These movements will be transmitted through the connecting rod 163, crank 165 and forked arms 169 to the slides 77, thereby shifting the chutes to the left to their positions shown in Figs. 10, 11 and 12.

When the wheel 115 is rotating in a clockwise direction, the rollers 121 will coöperate with the Geneva gear 131 and open the gate from its position shown at $a$ in Fig. 10 to its position shown at $b$ in Fig. 11. This will allow the batch of materials which has previously entered the mixer hopper to be delivered into the mixer.

When the wheel has rotated so as to bring the rollers 127 into coöperation with the Geneva gear 131, the gate will be moved from its open position shown at $b$ in Fig. 11 to its closed position shown at $a$ in Fig. 11.

When the wheel has rotated to bring the rollers 147 into coöperation with the Geneva gear 153, the chute will be shifted from its position shown at $c$ in Fig. 12 to its position shown at $d$ in Fig. 13 to discharge the batch of materials from the mixer.

When the wheel has rotated so as to bring the rollers 173 in coöperation with the Geneva gear 153, the chute will be shifted from its position shown at $b$ in Fig. 13 back to its position shown at $c$ in Fig. 12, so as to be in readiness to guide the next batch of materials into the mixer.

Suitable means may be provided to prevent rotative movement of the Geneva gears during the intervals when they are not being advanced steps by engagement of the rollers therewith. To this end, in the present instance, each of the Geneva gear shafts 133 and 155 may be provided with a block 179 (Figs. 5, 6 and 7) fast thereon. Coöperating with this block is a rock shoe 181 having a fork 183 at one end thereof fulcrumed on a pin 185 carried by one of the uprights 119. At the opposite end of the shoe 181 is a socket 187, and a coil spring 189 is confined between this socket and the base 87.

Figures 6, 7:
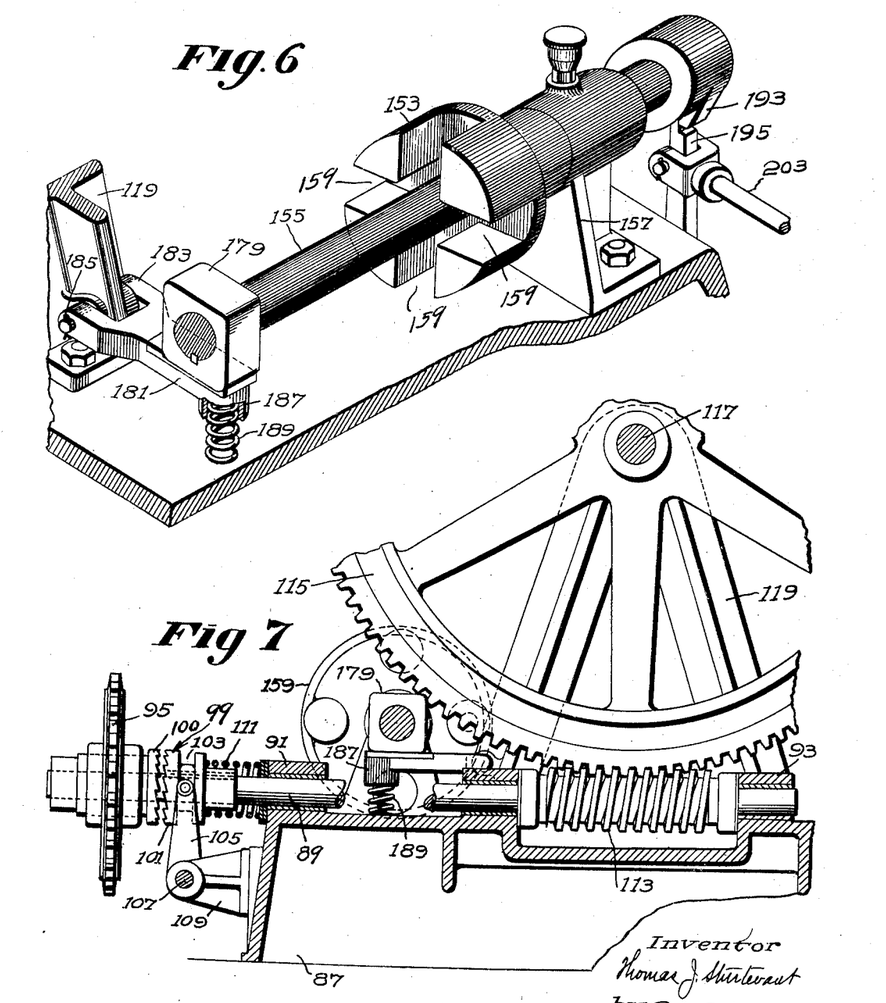
Fig. 6 is a perspective view of one of the Geneva gears and the stop device for holding the Geneva gear stationary during the intervals between the incremental rotative movements thereof.
Fig. 7 is a view partly in section and partly in elevation of the driving means for the main wheel of the controlling apparatus.

The construction is such that when the Geneva gear is being advanced a step, the corners of the block 179 will wipe down against the shoe 181 and rock the same downward (Fig. 5) against the resistance of the coil spring. So soon as a flat face of the block has been rotated to horizontal position, the coil spring will rock the shoe up against this flat face, as shown in Figs. 6 and 7, and prevent rotative movement of the Geneva gear until a roller is brought around so as to work into one of the radial slots of the Geneva gear, and turn the same a step. The construction of this spring-pressed shoe and block is such that it will not offer material resistance to the step rotative movements of the Geneva gear, but will prevent turning thereof during the intervals between its step movements.

It is desirable that the controlling apparatus shall be arrested when the chutes are shifted to positions in readiness to feed materials into the mixer, to guard against opening of the hopper gate until after a sufficient amount of time has elapsed to enable a batch of materials introduced into the assembly hopper to be elevated and be delivered into the mixer or feeding-in hopper 63.

To accomplish this, in the present instance of the invention, a sleeve 191 may be mounted fast on the Geneva gear shaft 155, and may have a lug 193 projecting therefrom adapted to engage a trigger 195 pivotally connected to an arm 197 fulcrumed on the base 87. This arm is urged upward against an adjustable stop 199 by a coil spring 201 having one end anchored to the base 87, and its opposite end connected to the arm 197. A rod 203 has one end connected to the trigger 195, and its opposite end connected to a crank 205 fast on the clevis shaft 107, referred to.

A cord 207 may have its upper end connected to an eye on the arm 197, and this cord may extend downward through the floor and be guided about pulleys 209 and 211, and have its lower end provided with a handle 213 within easy reach of the operator standing on the floor at the level of the upper end of the assembly hopper.

The construction is such that in the course of rotation of the Geneva gear 153 to shift the chute to feeding-in position, the lug 193 will engage the trigger 195, and the latter will operate through the rod 203 to rock the clevis 105 and shift the clutch member 101 out of engagement with the clutch member 99, thereby interrupting the drive of the worm gear shaft 93, and stopping rotation of the wheel 115.

When sufficient time has elapsed to elevate the batch from the assembly hopper and deliver the same into the mixer hopper, the operator pulls the cord 207, thereby moving the trigger 195 out from engagement with the lug 193. Thereupon, the spring 111 will become effective to shift the clutch member 101 into engagement with the clutch member 100, and rotation of the worm gear shaft and the main wheel will be resumed.

Then the cycle of operations will be repeated as before. That is, the rollers 121 will coöperate with the Geneva gear 131 to open the gate and deliver the batch of materials from the mixer hopper into the mixer. Then the rollers 127 will coöperate with the Geneva gear 131 to close the gate. Then the rollers 147 will coöperate with the Geneva gear 153 to shift the chutes to discharge the batch from the mixer. And then the rollers 173 will coöperate with the Geneva gear 153 to shift the chutes so as to be in readiness to guide the next batch of materials into the mixer on subsequent opening of the gate. Thereupon the control apparatus will be automatically arrested.

Thus, the controlling apparatus described automatically prevents the discharge of a batch of materials into the mixer until after the previous batch therein has been discharged therefrom.

Since the rollers 147 which control the shifting of the chutes to discharge the materials from the mixer are located on the wheel 115 a predetermined distance from the rollers 121 which control the opening of the gate, successive batches will remain in the mixer the same length of time before being automatically discharged therefrom. As a consequence, all of the batches are mixed the same length of time, and uniform mixing of the materials is insured, without relying upon the attention or control of the operator for this purpose.

In practice, the operator is soon able to sense the amount of time necessary for a batch to be elevated from the assembly hopper and be discharged into the mixer hopper.

If he knows sufficient time has not elapsed for the batch to reach and be fully delivered into the mixer hopper, as stated, he allows the machine to be stopped automatically by engagement of the lug 193 with the trigger 195 which operates through the rod 203 to open the clutch.

On the other hand, if he knows that sufficient time has elapsed for the batch to reach the mixer hopper, he pulls the cord 207, thereby moving the trigger 195 down out of the path of rotation of the lug 193, thereby preventing the same from being effective to stop the machine. Thus, the machine will continue to operate and the next cycle of operations will commence, without interruption between the cycle starting and the next preceding cycle.

When the machine has been stopped, the rollers 121 will be standing adjacent the Geneva gear 131 so that the hopper gate will be promptly opened when the trigger 195 is pulled out of engagement with the lug 193 to allow the spring 111 to close the clutch and start the cycle of operations.

By the present machine the period between admission of materials into and discharge thereof from the mixer is automatically determined, and as a consequence, complete proper mixing of the materials is assured. Successive batches may be automatically admitted into the mixer and discharged therefrom, and each batch is mixed the same length of time. The mixing period may be varied by varying the spacing of the valve opening rollers and the chute discharge rollers on the control wheel.

It will be understood that the invention is not limited to the specific embodiment shown, and that various deviations may be made therefrom without departing from the spirit and scope of the appended claims.

What is claimed is:—

1. A machine of the character described, comprising, in combination, a rotary mixer having elements therein for mixing materials, a fixed chute in said mixer, valve means movable to admit materials into the mixer and movable to deliver materials from the fixed chute out of the mixer, and means automatically to move said valve means to said positions.

2. A machine of the character described, comprising, in combination, a mixer having elements therein for mixing materials, a valve movable to positions to feed materials into and discharge the same from the mixer, and means automatically to shift said valve means to said positions.

3. A machine of the character described, comprising, in combination, a mixer, a hopper, a valve for said hopper, a valve for said mixer, drive means for said mixer, apparatus for controlling said valves automatically to admit materials into said mixer and discharge the same therefrom, and transmission means for operating the control apparatus from said drive means including a clutch, and means automatically to open said clutch to arrest the control apparatus.

4. A machine of the character described, comprising, in combination, a mixer, drive means therefor, a hopper to receive materials for delivery into the mixer, a valve for controlling delivery of materials from the hopper into the mixer, a valve for controlling discharge of materials from the mixer, and a control apparatus for operating said valves including a pair of Geneva gears and a wheel having elements coöperating with said Geneva gears for operating said valves at predetermined times.

5. A machine of the character described, comprising, in combination, a mixer, a hopper having an outlet, a valve for said outlet movable to open and closed positions, a valve for the mixer to control the discharge of materials therefrom, and control apparatus for said valves comprising a pair of Geneva gears, means operatively connecting the Geneva gears with said valves, and a wheel having elements thereon with predetermined spacing for coöperation with said Geneva gears to operate said valves at predetermined times.

6. A machine of the character described, comprising, in combination, a mixer, a hopper to receive materials for delivery to the mixer, a valve for said hopper movable to open and closed positions, a valve for said mixer movable to positions to admit materials to and discharge the same from the mixer, and a control apparatus for said hopper valve and mixer valve comprising a pair of Geneva gears, means operatively to connect the Geneva gears with said hopper valve and mixer valve respectively, and a wheel having pairs of elements thereon for coöperation with said Geneva gears to operate said valves at predetermined times.

7. A machine of the character described, comprising, in combination, a mixer, a hopper, a valve for the hopper movable to open and closed positions, a valve for the mixer movable to position to admit materials from the hopper into the mixer and to discharge the materials from the mixer, and a control apparatus comprising a pair of Geneva gears, means operatively to connect said Geneva gears with said hopper valve and mixer valve respectively, a rotary member having elements thereon for coöperation with said Geneva gears to operate the hopper valve and mixer valve at predetermined times, and means adjustably to connect said elements to said rotary member to vary the operation of said valves.

8. A machine of the character described, comprising, in combination, a mixer, a hopper having an outlet, a valve for said outlet movable to open and closed positions to deliver successive batches of materials from the hopper to the mixer, a valve for the mixer movable to positions to feed materials into the mixer and discharge the same therefrom, and control apparatus for said valves comprising a worm wheel, a worm meshing with said worm wheel, means to rotate said worm, Geneva gears, means operatively to connect the Geneva gears with the valves, and elements on said worm wheel in spaced relation for coöperation with said Geneva gears to operate the valve means at predetermined times.

9. A machine of the character described, comprising, in combination, a mixer, a hopper for receiving materials for delivery to the mixer, a valve for the hopper movable to open and closed positions, a valve for the mixer movable to a position to guide materials from the hopper valve into the mixer and to a position to discharge the materials from the mixer, and control apparatus for the valves including a pair of Geneva gears, means operatively to connect the Geneva gears with the valves, a wheel, elements thereon in spaced relation for coöperation with one of the Geneva gears to open and close the hopper valve, and elements on said wheel in spaced relation for coöperation with the other Geneva gear to shift the mixer valve for controlling feed of materials into mixer and discharge of the same therefrom.

10. A machine of the character described, comprising, in combination, a mixer, a hopper to receive materials for delivery into the mixer, a valve for the hopper movable to open and closed positions, a valve for the mixer movable to positions to feed materials from the hopper valve into the mixer and to discharge the materials therefrom, and control apparatus for the valves comprising a pair of Geneva gears, means operatively to connect the Geneva gears with the hopper valve and mixer valve respectively, a rotary wheel, pairs of elements thereon in spaced relation coöperating with one of the Geneva gears to open and close the hopper valve, and pairs of elements on said wheel for cooperation with the other Geneva gear to control the shifting of the mixer valve to its feeding and discharging positions.

11. A machine of the character described, comprising, in combination, a mixer, a hopper for receiving materials for delivery into the mixer, a valve for the hopper movable to open and closed positions, a valve for the mixer movable to positions for feeding materials into and for discharging materials from the mixer, and control apparatus for said valves for automatically opening the hopper valve, closing the hopper valve, moving the mixer valve to discharge position, and moving the mixer valve to feeding position in the order named.

12. A machine of the character described, comprising, in combination, a mixer, a hopper for receiving materials for delivery into the mixer, a valve for the hopper movable to open and closed positions, a valve for the mixer movable to positions for feeding the materials from the hopper valve into the mixer and to discharge the materials from the mixer, and control apparatus for said valves for operating the same in predetermined sequence and having provision for moving the mixer valve to its discharge position more slowly than to its feeding position.

13. A machine of the character described, comprising, in combination, a mixer, a hopper for receiving materials for delivery to the mixer, a valve for the hopper movable to open and closed positions, a valve means for the mixer movable to positions to feed materials from the hopper valve into the mixer and to discharge the materials from the mixer, and control apparatus for said valves comprising Geneva gears, means to transmit movements from the Geneva gears to the valves, a wheel, pairs of elements thereon for coöperation with one of the Geneva gears to move the hopper valve to its open and closed positions, and pairs of elements on said wheel for coöperation with the other Geneva gear to move the mixer valve to its feeding and discharge positions, the elements of one of the latter pairs being spaced a greater distance apart than the elements of the other pair to move the mixer valve more slowly to its discharge position than to its feeding position.

14. A machine of the character described, comprising, in combination, a mixer, a hopper to receive materials for delivery into the mixer, a valve for the hopper movable to open and closed positions, a valve for the mixer movable to positions to feed materials from the hopper valve into the mixer and to discharge materials from the mixer, and control apparatus for the valves comprising Geneva gears, means operatively to connect the Geneva gears with the valves, a wheel, and pairs of spaced elements thereon having provision incrementally to turn the Geneva gears to shift the valves to their positions.

15. A machine of the character described, comprising, in combination, a mixer, a hopper for receiving materials for delivery to the mixer, a valve for the hopper movable to open and closed positions, a valve for the mixer movable to positions to feed materials from the hopper valve into the mixer and to discharge materials from the mixer, and control apparatus for the valves comprising a pair of Geneva gears having radial recesses therein, a wheel, elements in spaced relation on said wheel adapted to work into said recesses to turn the Geneva gears, and means to transmit movements from the Geneva gears to the valves.

16. A machine of the character described, comprising, in combination, a mixer, means to rotate said mixer, a hopper for receiving materials for delivery, into the mixer, a valve for the hopper movable to open and closed positions, a valve for the mixer movable to positions to feed materials from the hopper valve into the mixer and to discharge the materials therefrom, and control apparatus for the valves comprising a worm wheel, a worm meshing with said wheel, transmission means to rotate said worm from the mixer rotating means including a clutch, a spring tending to close said clutch, a pair of Geneva gears, shafts for the latter, means to transmit movements from said shafts to said valves, respectively, elements on said wheel coöperating with said Geneva gears to impart rotary movements thereto, and means operated from the shaft for one of the Geneva gears for automatically opening the clutch to arrest the control apparatus.

17. A machine of the character described, comprising, in combination, a mixer, a hopper for receiving materials for delivery into the mixer, a valve for the hopper movable to open and closed positions, a valve for the mixer movable to positions for feeding materials from the hopper valve into the mixer and for discharging materials from the mixer, and control apparatus for the valves comprising a pair of Geneva gears having radial recesses therein, means operatively to connect the Geneva gears with the valves, a rotary wheel, elements thereon coöperating with the recesses of the Geneva gears to turn the latter to operate the valves, driving means for the wheel including a clutch, means automatically to open the clutch to arrest the wheel in the course of the rotation thereof, and means manually operable to prevent opening of said clutch to allow continued operation of the wheel.

18. A machine of the character described, comprising, in combination, a mixer, a hopper for receiving materials for delivery into the mixer, a valve for the hopper movable to open and closed positions, a valve for the mixer movable to positions to feed materials into and discharge the same from the mixer, and control means for the valves for automatically opening the hopper valve to deliver materials from the hopper into the mixer, closing said valve, moving the mixer valve to discharge materials therefrom, and moving said mixer valve into position for feeding materials into the mixer in the order named, and means for automatically arresting the control apparatus on movement of the mixer valve into feeding-in position.

19. A machine of the character described, comprising, in combination, a mixer, a hopper for receiving materials for delivery into the mixer, a valve movable to open and closed positions, a valve for the mixer movable to positions to deliver materials into the mixer and to discharge the same therefrom, and control apparatus for the valves comprising Geneva gears having radial recesses therein, a wheel having elements thereon adapted to work into said recesses to turn the Geneva gears step, means to transmit movements from the Geneva gears to the valves, and means coöperating with the Geneva gears to hold the same against rotative movement during the intervals between their step movements.

20. A machine of the character described, comprising, in combination, a mixer, a hopper, valves for said hopper and mixer to control feed of materials from the hopper into the mixer and discharge of materials from the mixer, and control apparatus for the valves including Geneva gears, a wheel having elements for coöperation with the Geneva gears to turn the same step-by-step, shafts for the Geneva gears, blocks on said shafts, and spring-pressed shoes coöperating with said blocks to hold the Geneva gears stationary in the intervals between their step feeds.

21. A machine of the character described, comprising, in combination, a mixer, a hopper, valves for controlling feed of materials from the hopper into the mixer and discharge of the materials from the mixer, and control apparatus comprising Geneva gears, a wheel having spaced elements thereon for coöperation with the Geneva gears incrementally to turn the latter to operate the valves, shafts for the Geneva gears, driving means for said wheel including a clutch, a trigger, means connecting said trigger with said clutch, and means operated by one of the Geneva gear shafts for moving said trigger to open the clutch and arrest the control apparatus.

22. A machine of the character described, comprising, in combination, a mixer, a hopper, valves for controlling feed of materials from the hopper into the mixer and discharge of the materials from the mixer, and control apparatus comprising Geneva gears, a wheel having spaced elements thereon for coöperation with the Geneva gears incrementally to turn the latter to operate the valves, shafts for the Geneva gears, driving means for said wheel including a clutch, a trigger, means connecting said trigger with said clutch, means operated by one of the Geneva gear shafts for moving said trigger to open the clutch and arrest the control apparatus, and manually operable means for moving the trigger away from its operating means to prevent opening of the clutch and arrest of the apparatus.

23. A machine of the character described, comprising, in combination, a mixer, a hopper for receiving materials for delivery into the mixer, valves for the hopper and mixer to control feed of the materials from the hopper into the mixer and discharge of the materials from the mixer, and control apparatus for said valves having provision for operating the mixer valve to discharge materials a predetermined time after operation of the hopper valve to feed materials into the mixer.

24. A machine of the character described, comprising, in combination, a mixer, a hopper for receiving materials for delivery into the mixer, valves for the hopper and mixer to control feed of the materials from the hopper into the mixer and discharge of the materials from the mixer, and control apparatus for said valves comprising a pair of Geneva gears, a wheel having elements thereon for coöperation with the Geneva gears to turn the same by steps, and means coöperating with the Geneva gears to prevent rotative movements of the latter in the intervals between the movements thereof by the elements on the wheel.

25. A machine of the character described, comprising, in combination, an elevator, an assembly hopper therefor, a separator for receiving materials elevated from the assembly hopper, a mixer, a hopper to receive materials from the separator for delivery to the mixer, valves for the hopper and mixer to control feed of materials into and delivery of the materials from the mixer, and control apparatus for said valves for opening the hopper valve, closing the hopper valve, shifting the mixer valve to discharge materials, and shifting the mixer valve to feed materials into the mixer in the order named.

26. A machine of the character described, comprising, in combination, a mixer, a hopper for receiving materials to be delivered into the mixer, a valve for the hopper movable to open and closed positions, a valve for the mixer movable to positions to admit materials into and discharge of the same from the mixer, and control apparatus for said valves comprising a pair of Geneva gears, shafts therefor, a wheel having elements thereon for coöperation with the Geneva gears to operate said valves, and means coöperating with the Geneva gear shaft for the mixer valve automatically to arrest the control apparatus on movement of the Geneva gear for the mixer valve to shift the latter to feeding-in position.

27. A machine of the character described, comprising, in combination, a mixer, a hopper for receiving materials to be delivered into the mixer, a valve for the hopper movable to open and closed positions, a valve for the mixer movable to positions to admit materials into and discharge of the same from the mixer, and control apparatus for said valves for automatically opening the hopper valve, closing said valve, shifting the mixer valve to discharge position, and shifting said valve to feeding-in position, and means automatically to arrest the control apparatus in position promptly to open the hopper valve after starting the apparatus.

28. A machine of the character described, comprising, in combination, an elevator having an assembly hopper, a separator to receive materials elevated from the assembly hopper, a mixer having a hopper for receiving materials from the separator, driving means for the mixer, a valve for the mixer hopper movable to open and closed positions, a valve for the mixer movable to a position to feed materials from the hopper into the mixer, and to a position to discharge materials from the mixer, and control apparatus for said valves comprising Geneva gears, means to impart movements from said Geneva gears to the hopper valve and mixer valve respectively, a worm wheel, pairs of elements thereon for coöperation with the Geneva gears incrementally to turn the latter to open and close the valves, a worm meshing with said worm wheel, a shaft for said worm, a transmission between the mixer driving means and worm shaft having a clutch, and means automatically to open said clutch to arrest the control apparatus in the course of the rotation of one of the Geneva gears.

29. A machine of the character described, comprising, in combination, a mixer, a casing having an opening communicating with said mixer, a hopper communicating with said casing and having an outlet, a valve for said outlet, a valve for said opening, and operating means for said valves having provision for opening the outlet valve to deliver materials from the hopper to the mixer, closing said valve, moving the opening valve to position to discharge the materials from the mixer, and moving the latter valve to position for guiding materials from the outlet valve into the mixer.

30. A machine of the character described, comprising, in combination, a mixer, a hopper for receiving batches of materials for delivery to the mixer, a valve for the hopper, a valve for the mixer, and control means for said valves having provision for opening the hopper valve, closing the same, shifting the mixer valve to discharging position, and shifting the mixer valve to position to guide materials from the hopper valve into the mixer in the order named, and means automatically to arrest the control apparatus when the hopper valve is closed to prevent delivery of a batch from the hopper in the mixer until after the complete batch has reached the hopper.

31. A control apparatus of the character described, comprising a pair of Geneva gears, a wheel having pairs of elements thereon for coöperation with said Geneva gears to advance the same steps at intervals, the elements for one of said Geneva gears being on one side of said wheel, and the elements for the other Geneva gear being on the opposite side of said wheel, that the pairs of elements may impart rotative movements to the respective Geneva gears twice in each complete rotation of the wheel.

32. A machine of the character described, comprising, in combination, a rotary mixer having elements therein for mixing materials, valve means operable to admit successive batches of materials into the mixer and to discharge the same therefrom, control mechanism for the valve means having means for automatically moving the valve means to position to admit a complete batch into the mixer, and means for automatically moving the valve means to discharge the batch from the mixer after it has been mixed a predeterminal length of time.

33. A machine of the character described, comprising, in combination, a rotary mixer having an opening therein, valve means movable to a position to admit a batch of materials through said opening into said mixer and movable to a position to discharge a batch through said opening from the mixer, and means automatically to move said valve means to said positions at predetermined intervals automatically to admit successive batches into the mixer and to discharge the same therefrom after they have been mixed during periods of equal extent.

34. A machine of the character described, comprising, in combination, a mixer having a casing and elements therein for mixing materials, means to rotate said casing means independent of the rotary casing to admit the materials into and to discharge the same from the casing, and means automatically to operate said means to control admission of the materials into said casing and their discharge therefrom.

35. A machine of the character described, comprising, in combination, a mixer having a rotary casing and elements therein for mixing materials, valve means movable to admit materials into the casing and to discharge the same therefrom, and a control unit separate from the rotary casing for automatically operating the valve means.

36. A machine of the character described, comprising, in combination, a mixer having a rotary casing, valve means operable to admit materials into the casing and to discharge the same therefrom, a control unit separate from the rotary casing having means connecting the unit with the valve means for automatically operating the same to admit materials into the casing and to discharge the same therefrom.

37. A machine of the character described, comprising, in combination, a mixer having a rotary casing and elements therein for mixing materials, a hopper, a valve for the hopper, a valve for the mixer, and a control unit separate from the rotary casing for automatically operating said valves to admit batches of materials into the casing and to discharge the same therefrom.

38. A control apparatus of the character described, comprising a pair of Geneva gears, a wheel having elements thereon for coöperation with said Geneva gears to advance the same steps at intervals, the elements for one of said Geneva gears being on one side of said wheel, and the elements for the other Geneva gear being on the opposite side of said wheel, that the elements may impart rotative movements to the respective Geneva gears in each complete rotation of the wheel.

In testimony whereof, I have signed my name to this specification.

THOMAS J. STURTEVANT.